US009313491B2

(12) United States Patent
Chiu et al.

(10) Patent No.: US 9,313,491 B2
(45) Date of Patent: Apr. 12, 2016

(54) CHROMA MOTION VECTOR PROCESSING APPARATUS, SYSTEM, AND METHOD

(71) Applicant: Intel Corporation, Santa Clara, CA (US)

(72) Inventors: Yi-Jen Chiu, San Jose, CA (US); Mei-Chen Yeh, Goleta, CA (US); Prasenjit Biswas, Saratoga, CA (US); Louis Lippincott, Los Altos, CA (US)

(73) Assignee: INTEL CORPORATION, Santa Clara, CA (US)

(*) Notice: Subject to any disclaimer, the term of this patent is extended or adjusted under 35 U.S.C. 154(b) by 18 days.

(21) Appl. No.: 13/744,921

(22) Filed: Jan. 18, 2013

(65) Prior Publication Data
US 2013/0202041 A1    Aug. 8, 2013

Related U.S. Application Data

(63) Continuation of application No. 11/475,413, filed on Jun. 27, 2006, now Pat. No. 8,379,723.

(51) Int. Cl.
H04N 7/12      (2006.01)
H04N 19/51     (2014.01)
H04N 19/513    (2014.01)
H04N 19/112    (2014.01)
H04N 19/186    (2014.01)
H04N 19/573    (2014.01)

(52) U.S. Cl.
CPC ....... *H04N 19/00587* (2013.01); *H04N 19/112* (2014.11); *H04N 19/186* (2014.11); *H04N 19/51* (2014.11); *H04N 19/513* (2014.11); *H04N 19/573* (2014.11)

(58) Field of Classification Search
CPC .............................................. H04N 19/00587
USPC ...................................................... 375/240.16
See application file for complete search history.

(56) References Cited

U.S. PATENT DOCUMENTS

2005/0053134 A1*  3/2005  Holcomb ................. 375/240.12
2005/0053145 A1*  3/2005  Hsu et al. ................. 375/240.16
2006/0023788 A1*  2/2006  Otsuka et al. ............ 375/240.16

* cited by examiner

*Primary Examiner* — Richard Torrente
(74) *Attorney, Agent, or Firm* — Kacvinsky Daisak Bluni PLLC

(57) ABSTRACT

A system, apparatus, method, and article to process a chroma motion vector are described. The apparatus may include a video decoder. The video decoder includes a processor to receive a compressed video bitstream. The compressed video bitstream includes a stream of pictures. The stream of pictures includes a current slice and a current block within the slice. The processor pre-computes a chroma motion vector adjustment parameter for the current slice and determines a motion vector component for the current block within the current slice using the pre-computed chroma motion vector adjustment parameter.

16 Claims, 7 Drawing Sheets

CHROMA MOTION VECTOR PROCESSING APPARATUS, SYSTEM, AND METHOD

This application is a continuation application which claims benefit of, and priority to, co-pending U.S. patent application Ser. No. 11/475,413 titled "CHROMA MOTION VECTOR PROCESSING APPARATUS, SYSTEM, AND METHOD" filed on Jun. 27, 2006, the entirety of which is hereby incorporated by reference.

BACKGROUND

Video compression is used in many current and emerging products such as digital television set-top boxes (STBs), digital satellite systems (DSSs), high definition television (HDTV) decoders, digital versatile disk (DVD) players, video conferencing, Internet video and multimedia content, and other digital video applications. Without video compression, digital video content can be extremely large, making it difficult or even impossible it to be efficiently stored, transmitted, or viewed. Broadcast television (TV) and home entertainment systems have improved vastly in recent years due largely in part by the advent of digital TV and DVD video. The standardization of video compression (video coding) technology, such as the MPEG (Motion Picture Experts Group) series of compression standards made the above listed and other applications possible. The new MPEG4 standard in the MPEG series is enabling Internet-based video applications, while the International Telecommunications Union (ITU) Telecommunication Standardization Sector (ITU-T) H.263 video compression standard is now widely used in videoconferencing systems.

The most recent international standard for video image encoding/decoding and compression to be widely pursued by industry is the International ITU-T International Organization for Standardization (ISO) video compression standard known as ITU-T/ISO H.264 or as advanced video codec (AVC) and MPEG-4 Part 10 ("H.264 standard" hereinafter). The H.264 standard was prepared by the Joint Video Team (JVT), which included the ITU-T SG16 Q.6, known as VCEG (Video Coding Expert Group), and the ISO/IEC JTC1/SC29/WG11, known as MPEG. The H.264 standard is designed for the applications in the area of Digital TV broadcast (DTV), Direct Broadcast Satellite (DBS) video, Digital Subscriber Line (DSL) video, Interactive Storage Media (ISM), Multimedia Messaging (MMM), Digital Terrestrial TV Broadcast (DTTB), and Remote Video Surveillance (RVS), among other video compression applications.

Video image encoding and other processing systems and methods to compress, compute, estimate, compensate, and/or reconstruct motion vectors in a video sequence require adequate resources to process the raw video digital signals. A video codec, such as the H.264/AVC Video codec, or other video processor, video decoder, or media processor may be used to implement such video processing functions. Multi-picture motion estimation, compensation, chroma vector adjustment, field based coding, macroblock adaptive frame field coding, motion prediction using a video codec requires extensive computations and adequate computing resources for processing the raw video digital signals.

Motion compensation may be defined as the process of compensating a current macroblock in a frame to be predicted based on a block in a previously decoded frame. Motion compensation among multiple reference pictures may be pursued by a block-based match for the luma pixels of the picture. As is well known in the art, a pixel is one of many picture elements that make up the representation of a picture in a computer memory. To utilize the spatial correlation between the luma and chroma pixels to achieve higher coding efficiency without executing the motion estimation on the chroma pixel, the H.264 standard recommends the same luma motion vector to be used for the chroma motion vector prediction. In the case of field coding video, the H.264 standard recommends the vertical component of chroma motion vector needed to be adjusted based on the field parities of current macroblock and the reference macroblock. The process of adjusting the chroma motion vector may require the field parity information of the reference motion vector, which is stored in an external memory device. Further, the process of adjusting the chroma motion vector requires many logic comparisons to be executed for every motion vector inside the macroblock. Because this process is executed at the macroblock level and there are many macroblocks for high definition video (8160 macroblocks per picture, for example), the implementation may be computationally complex and very costly. Reducing the computational complexity while maintaining accuracy in estimating the motion vector may be difficult to accomplish.

DETAILED DESCRIPTION

Figure 1:
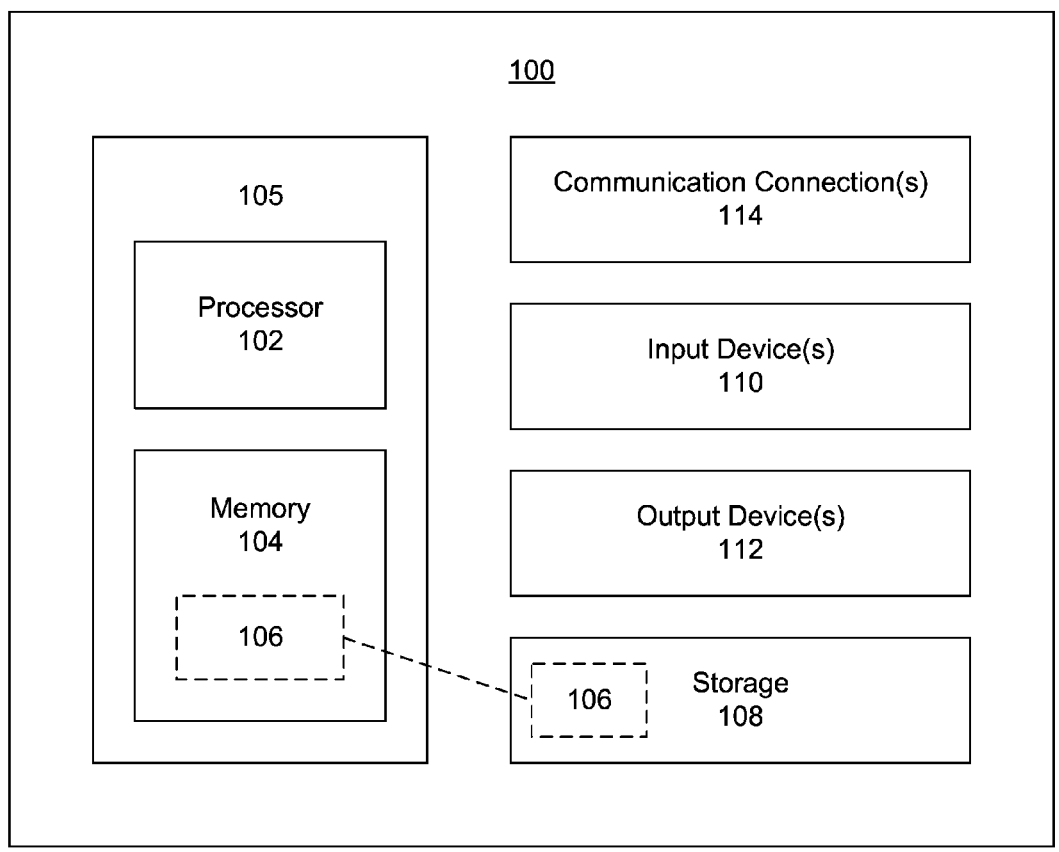
FIG. 1 illustrates one embodiment of a suitable computing environment in which several of the described embodiments may be implemented.

In various described embodiments a video encoder and decoder incorporate techniques to optimize the operations for processing the chroma motion vector reconstruction of a H.264 standard video codec. The H.264 standard is a video compression specification for low bit rate visual communications and provides better video compression efficiency than previous ITU-T standards. The H.264 standard is a block-based coding technique that utilizes the transform coding and entropy coding on the residue of a motion compensated block. The H.264 standard permits motion compensation prediction from the reference pictures in two reference lists.

In various described techniques, an efficient architecture may be provided for partitioning the processing task among the slice and macroblock levels by pre-computing the chroma vector adjustment vectors at the slice layer and using the pre-computed chroma adjustment vectors at the macroblock level processing. At the macroblock level processing, this may be simplified to a table look-up process. Further described techniques provide minimal storage requirements and reduce the computational complexity for reconstructing the chroma motion vector. The various described embodiments and/or techniques may be implemented on various software/hardware platforms. For example, in various embodiments, a video/image processor may comprise a technique to optimize the processing operations for reconstructing the chroma motion vector of an H.264 standard video decoder. Another technique may be provided to reduce the computational complexity of reconstructing the chroma motion vector by providing the pre-computed chroma motion vector adjustment arrays at the slice layer. A further technique is provided to pre-compute the chroma motion vector adjustment arrays for the coding modes of macroblock adaptive frame field (MBAFF) and non-MBAFF of the H.264 standard. Another technique is provided to access the pre-computed chroma motion vector adjustment arrays through the technique of table look up at the macroblock level for reconstructing the chroma motion vector. Yet another technique is provided to optimize the macroblock level processing for adjusting the chroma motion vector for the MBAFF and non-MBAFF coding modes.

In various described embodiments, a software/hardware architecture partition may be implemented to minimize storage resources and to reduce the computational complexity of the chroma motion vector adjustment process. The process may be divided among slice and macroblock level utilizing various techniques described herein to pre-compute the chroma motion vector adjustment arrays at the slice layer. In various embodiments, the technique may be optimized for the MBAFF and non-MBAFF cases. Using the pre-computed chroma motion vector adjustment arrays, the macroblock process may be significantly simplified and reduced to an index look-up of the pre-computed chroma motion vector adjustment array. For high definition video, where the number of slices per picture (e.g., 1 to 8 slices usually) is much smaller than the number of macroblocks per picture (e.g., 8160), the overhead for pre-computing the chroma motion vector adjustment arrays at the slice layer may be negligible compared to the significant savings in complexity at every macroblock level.

In various described embodiments, the storage requirement and the computational complexity for processing the chroma motion vector reconstruction for the field coding mode of an H.264 standard video decoder may be minimized. The various techniques described herein, however, also may apply to various hardware/software platforms to reduce the complexity of video decoder product based on the H.264 standard.

The various described techniques may be employed to provide high performance H.264 standard video codecs implemented in both hardware-based and software-based product. A video/image processor comprising an efficient H.264 standard video codec may be implemented in multi-core processor designs and may be utilized in a broad range of applications, such as, for example, digital home technology products comprising a specific platform designed for digital entertainment, such as, for example, the Intel® Viiv™ technology.

Accordingly, the various techniques described herein provide H.264 standard coding to pre-compute the chroma motion vector adjustment arrays at the slice layer to simplify the macroblock level operation to reduce the total complexity of a video decoder. Because the number of macroblocks per picture is large compared to the number of slices per picture, reducing the macroblock level processing provides significant computational savings per picture. For example, the number of macroblocks for high definition video is 8160 for a picture size of 1920*1080 while the number of slices per picture is usually 1 to 8 slices. Accordingly, the number of operation cycles per picture adds up to a large number when processing at the macroblock level. Utilizing the pre-computed chroma motion vector adjustment arrays, as described herein, however, simplifies the task of reconstructing the chroma motion vector at the macroblock level and becomes a table look-up task without necessarily employing logical comparisons at the macroblock level. Accordingly, this may result in significant savings in complexity at the macroblock level.

Accordingly, the various embodiments described herein may be generally directed to chroma vector processing apparatuses, systems, and methods. In one embodiment, for example, a video decoder comprises a processor to receive a compressed video bitstream. The compressed video bitstream comprises a stream of pictures. The stream of pictures comprises a current slice and a current block within the slice. The processor is to pre-compute a chroma motion vector adjustment parameter for the current slice and to determine a motion vector component for the current block within the current slice using the pre-computed chroma motion vector adjustment parameter. In this manner, video/image processors may be implemented utilizing the H.264 standard video codec techniques described herein to reduce the computational complexity for reconstructing the chroma motion vector by employing the pre-computed chroma motion vector adjustment arrays at the slice layer to simplify the operation executing at the macroblock level. A picture usually comprises 1 to 8 slices, which is much lower than the number of macroblocks per picture, which may be as high as 8160. Accordingly, the additional overhead to pre-compute the chroma motion vector adjustment arrays at the slice layer may be negligible compared to the significant saving in operation cycles accumulated at every macroblock level. In addition, the various described techniques may be applied to various software/hardware based video/image processor platforms based on the H.264 standard video decoder.

The various described embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of a suitable computing environment 100 in which several of the described embodiments may be implemented. The computing environment 100, however, is not intended to suggest any limitation as to scope of use or functionality, as the techniques and tools may be implemented in diverse general-purpose or special-purpose computing environments. Accordingly, in one embodiment, the computing environment 100 may comprise a processor 102, and memory 104. In one embodiment, a basic computing environment 105 comprises the processor 102 and the memory 104. The processor 102 may comprise one or more processors. The processor 102 executes computer-executable instructions and may be a real or a virtual processor. In a multi-processing system, multiple processors execute computer-executable instructions to increase processing power, for example. The memory 104 may be a volatile memory (e.g., registers, cache, RAM), non-volatile memory (e.g., ROM, EEPROM, flash memory, etc.), or some combination of the two. The memory 104 stores software 106 to implement a chroma motion vector reconstruction video encoder or decoder to pre-compute the chroma vector adjustment vectors at the slice layer and to reduce the computational complexity for chroma motion vector reconstruction. The memory 104 may be organized to store a look up table comprising pre-computed chroma adjustment vectors (described below). The embodiments, however, are not limited to the elements or the arrangement shown or described in FIG. 1.

In one embodiment, the computing environment 100 also may comprise storage 108, one or more input devices 110, one or more output devices 112, and one or more communication connections 114. An interconnection mechanism (not shown) such as a bus, controller, or network interconnects the components of the computing environment 100. Operating system software (not shown) provides an operating environment for other software executing in the computing environment 100, and coordinates activities of the components of the computing environment 100.

The storage 108 may comprise removable or non-removable media, and includes magnetic disks, magnetic tapes or cassettes, CD-ROMs, DVDs, or any other medium which can be used to store information and which can be accessed within the computing environment 100. The storage 108 stores instructions for the software 106 to implement the video encoder or decoder in accordance with the embodiments described herein.

The input device(s) 110 may comprise a touch input device such as a keyboard, mouse, pen, or trackball, a voice input device, a scanning device, or another device that provides input to the computing environment 100. For audio or video encoding, the input device(s) 110 may be a sound card, video card, TV tuner card, or similar device that accepts audio or video input in analog or digital form, or a CD-ROM or CD-RW that reads audio or video samples into the computing environment 100. The output device(s) 112 may comprise a display, printer, speaker, CD-writer, or another device that provides output from the computing environment 100.

The communication connection(s) 114 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media may include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media may include memory 104, storage 108, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Figure 2:
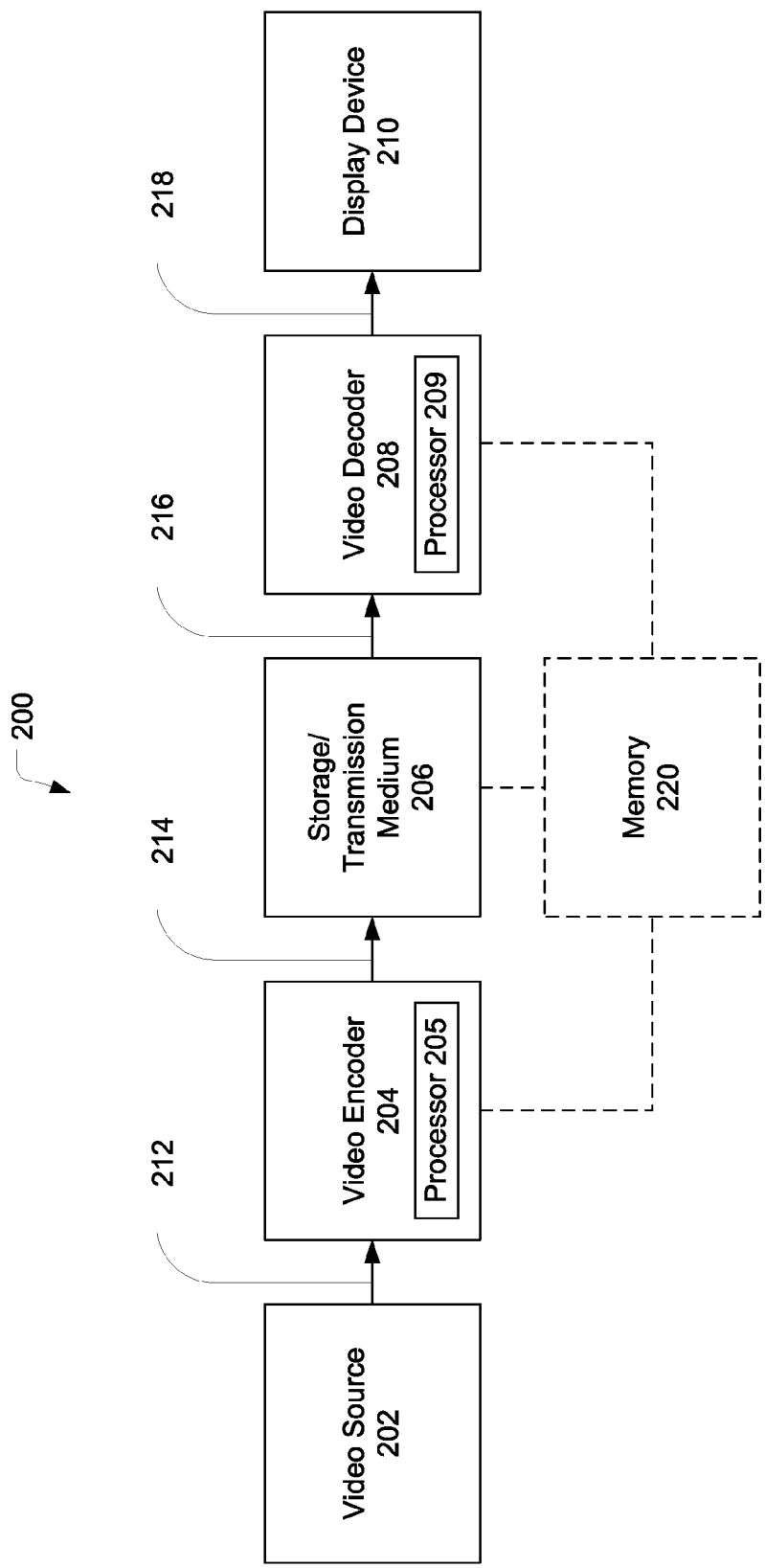
FIG. 2 illustrates one embodiment of a video encoding/decoding system 200 in which several of the described embodiments may be implemented.

FIG. 2 illustrates one embodiment of a video encoding/decoding system 200 in which several of the described embodiments may be implemented. In one embodiment, the video encoding/decoding system 200 may comprise an H.264 standard video encoder/decoder processing system, although the embodiments are not limited in this context. For example, the video encoding/decoding system 200 may be suitable to encode, decode, transmit, store, and reconstruct video in accordance with the various techniques described herein. The system shown in FIG. 2 may comprise a video source 202, a video encoder 204, a storage/transmission medium 206, a video decoder 208, and a display device 210. Other components or elements such as processor 205 and processor 209 may be provided, for example, to implement the functionality of the respective video encoder 204 and the video decoder 208. The storage/transmission medium 206 may store and/or transmit or receive digital video information. In one embodiment, a memory 220 may be provided for temporary storage of picture frame information, for example. The storage/transmission medium 206 and/or the memory 220 may store a look up table comprising pre-computed chroma adjustment vectors in accordance with the various embodiments discussed below. Any of the video encoder 204, video decoder 208, and/or storage/transmission medium 206 may be implemented utilizing elements of the computing environment 100 shown in FIG. 1. The embodiments, however, are not limited to the elements or the arrangement shown or described in FIG. 2.

The original, full information content video signal, e.g., in analog format, may be provided to the video source 202. The video source 202 may perform various functions such as, digitization of the video signal into a luminance (luma) and chrominance (chroma) format, e.g., YCbCr, YUV, YIQ, and YCC family of color spaces. Those skilled in the art will appreciate that for the YCbCr color space Y is the luma component and Cb and Cr are the chroma components; for the YUV color space Y is the luma component and U and V are the chroma components; for the YIQ color space Y is the luma component and I and Q are the respective in-phase and quadrature chroma components; and for the YCC color space Y is the luma component and C (Cb) and C (Cr) are the chroma components. The video source 202 provides the formatted digitized luma and chroma video signals to the video encoder 204. Regardless of the particular video format, the video source 202 performs the necessary processing to supply a full-information digital video signal version of the original analog video signal to the video encoder 204. In various embodiments, the video source 202 may be a transmission medium or a stored file. The video source 202 may provide the digital video signal sequences in the form of picture frames to the encoder 204.

The coding structure of the H.264 standard is similar to that of prior major digital video standards such as, for example, H.261, MPEG-1, MPEG-2/H.262, H.263 or MPEG-4 part 2. The architecture and the core building blocks of the video encoder 204 also may be based on motion-compensated transform coding. For example, each picture may be compressed by partitioning it as one or more slices, where each slice comprises one or more macroblocks. Macroblocks may be defined as blocks of 16×16 luma samples (or pixels) with corresponding chroma samples. Each macroblock also may be divided into one or more sub-macroblock partitions for motion-compensated prediction as shown below in FIGS. 4A-F, for example. The prediction partitions may comprise multiple different sizes, such as, for example, 16×16, 16×8, 8×16, 8×8, 8×4, 4×8, and 4×4. Motion compensation may be applied to an entire macroblock or may be applied to 16×16 or 8×8 partitions. In one embodiment, the 8×8 partition or sub-macroblock may be the smallest available size for processing. The latter may provide enhanced prediction accuracy. The spatial transform for the residual data may be either 8×8 or 4×4, for example. A hierarchy of a video sequence from sequence to samples may be given by:

sequence (pictures (slices (macroblocks (macroblock partitions (sub-macroblock partitions (blocks (samples)))))).

Additional structures such as packetization schemes and channel codes, among others, also may be provided. These structures may relate to the delivery of the video data bitstream, among other data bitstreams such as audio. Because video compression tools work primarily at or below the slice layer, bits associated with the slice layer and below may be identified as Video Coding Layer (VCL) data and bits associated with higher layers are identified as Network Abstraction Layer (NAL) data.

The video encoder 204 receives the digital video signal sequence 212 from the video source 202 in the form of video input frames. The encoder 204 compresses the video input frames and passes compressed video bits 214 in the form of a bitstream to the storage/transmission medium 206 (and/or the memory 220). In one embodiment, the compression may be performed in accordance with the H.264 standard specification and the output bitstream may be an H.264 standard bitstream. The video encoder 204 receives video input frames for encoding. The frames are processed in units of a macroblock corresponding to blocks of 16×16 pixels in the original image. Each macroblock is encoded. A prediction macroblock is formed based on a reconstructed frame. In one mode, the prediction macroblock may be formed from samples in a current frame that were previously encoded, decoded, and reconstructed. In another mode, the prediction macroblock may be formed by motion-compensated prediction from one or multiple reference frames. The prediction macroblock is subtracted from the current macroblock to produce a residual or difference macroblock. Using a block transform, the residual or difference macroblock is transformed and quantized to provide a set of encoded coefficients in addition to other information required to decode the macroblock and to form a compensated bitstream. The other information may comprise, e.g., macroblock prediction mode, quantizer step size, motion vector information describing how the macroblock was motion-compensated, among others. The compensated bitstream may be passed to the storage/transmission medium 206 for transmission and storage.

The storage/transmission medium 206 provides a method and medium by which the encoded video signal eventually may be supplied to the video decoder 208. For example, the storage/transmission medium 206 may be a digital communication system. Alternatively, the storage/transmission medium 206 may be an arrangement that includes a disk writer, a disk that is written with the encoded video signal by the disk writer, and a disk reader that retrieves the encoded video signal from the disk, for example.

The video decoder 208 receives an encoded/compressed digital video signal 216 in the form of a bitstream comprising the compressed video bits 214 from the storage/transmission medium 206 (and/or the memory 220 and/or the video encoder 204) and decodes it to produce a decoded video signal 218 that is supplied to the display device 210. In one embodiment, the encoded/compressed video signal 216 may be in the form of an H.264 standard specification bitstream. In general principle, the video decoder 208 conceptually works in reverse to the video encoder 204 and may comprise primarily an entropy decoder among various other processing elements. The video signal 214 produced by the video decoder 206 may be identical to the signal supplied to the video encoder 204 if the video encoder 204 employs a lossless encoding method. The video signal 214 produced by the video decoder 206 may differ somewhat from the signal supplied to the video encoder 204 if the video encoder 204 employs a lossy encoding method, e.g., an MPEG-like encoding method.

In operation, one embodiment of the system 200 illustrated in FIG. 2 may be configured to perform digital video processing in accordance with the H.264 standard specification. For, example, in one implementation, the video encoding/decoding system 200 may be configured and adapted to perform the H.264 standard block-based coding techniques described herein to utilize the transform coding and entropy coding on the residue of a motion compensated block.

In general operation, the video encoding/decoding system 200 may be configured and adapted to simplify or reduce the computational complexity required for reconstructing the chroma motion vector. In one embodiment, pre-computing the chroma motion vector adjustment arrays at the slice layer simplifies the operation executing at the macroblock level, for example. Using the pre-computed chroma motion vector adjustment arrays, the process of reconstructing the chroma motion vector at the macroblock level may be implemented as a table look-up, which may not require any logical comparison at the macroblock level and this may result in significant saving in complexity. In one embodiment, the video encoding/decoding system 200 may be implemented in various software/hardware based platforms suitable for implementing a H.264 standard video decoder. As previously discussed, one embodiment of a suitable platform for implementing a H.264 standard video decoder is computing system 100 shown in FIG. 1.

Figure 3A:
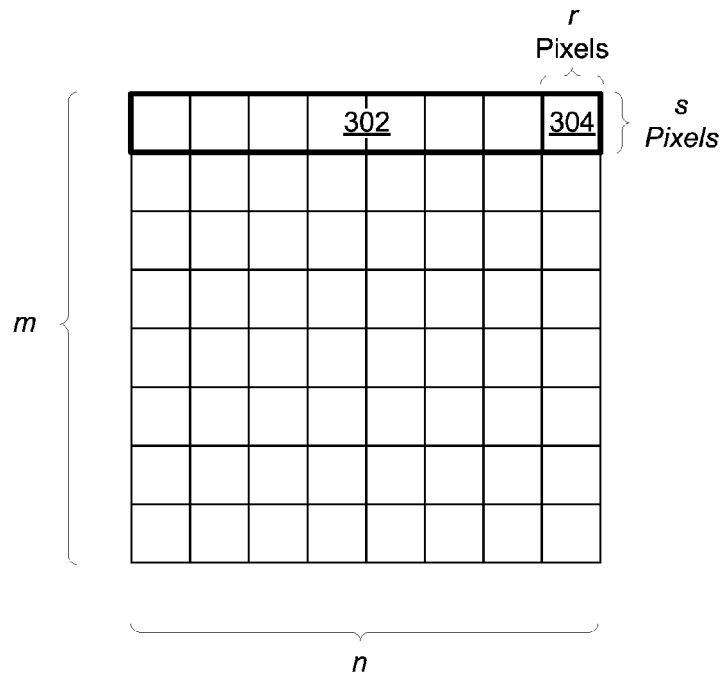
FIG. 3A illustrates one embodiment of a picture 300 divided into slices 302.

FIG. 3A illustrates one embodiment of a picture 300 divided into slices 302. A slice 302 comprises a group of macroblocks 304. When the picture 300 is already decoded, it may be referred to as a decoded reference picture comprising associated slices 302 and macroblocks 304. Reference indices may point to a reference picture contained in a reference lists. The H.264 standard video compression provides two reference lists for each reference picture. When a macroblock 304 or sub-macroblock (e.g., as shown in FIGS. 4A-F) is to be encoded in a current picture 300, the slice 302 may be referred to as the current slice and the macroblock (or sub-macroblock) may be referred to as a current macroblock (or sub-macroblocks). Throughout this description, a macroblock and/or a sub-macroblock may be referred to generally as a "block" for the sake of simplicity. A block is a rectangular group of pixels. As illustrated in FIG. 3A, the macroblock 304 is a rectangular group of pixels. As shown in FIG. 3A, the size of the macroblock 304 is r×s pixels. In one embodiment, r=s=16 and the macroblock 304 is comprises 16×16 pixels, for example. In accordance with the H.264 standard, the macroblock 304 may comprise r×s luma pixels. In various embodiments, the picture 300 may comprise m slices 302 and n macroblocks 304 per slice. As illustrated in FIG. 3A, the number of macroblocks 304 per picture (m×n) is generally much greater than the number of slices per picture (m). In one embodiment, for example, in high-definition video applications, the number of macroblocks 304 per picture 300 (m×n) is 8160 (e.g., for a picture size of 1920×1080) and the number (m) of slices 304 per picture 300 may vary from 1 to 8 slices, for example. The embodiments, however, are not limited to the elements or the arrangement shown or described in FIG. 3A.

As discussed hereinbelow, chroma motion vector adjustment arrays may be pre-computed for every slice 302 in the picture 300 to simplify the operation executing at the macroblock 304 level. Because there are much fewer slices 302 than macroblocks 304 per picture 300, this minimizes the computational complexity of the conventional execution of the chroma motion vector reconstruction process, which requires a series of logic comparisons to calculate the chroma motion vector for every macroblock 304.

Each slice 302 in the picture 300 may be a chroma slice or a monochrome slice. No chroma adjustment is made for a monochrome slice. The slice 302 also may be defined by information contained in two reference lists, RfListX (X=0, 1), in accordance with the H.264 standard. Furthermore, the slice 302 may be characterized as an MBAFF or a non-MBAFF slice. At the slice processing level, chroma adjustment arrays may be pre-computed based on the MBAFF property of the slice 302, e.g., based on whether the slice 302 is an MBAFF or a non-MBAFF slice. For example, for a non-MBAFF slice, during slice layer processing, one chroma adjustment array are pre-computed for each reference list RfListX (X=0, 1). For an MBAFF slice, two chroma adjustment arrays are pre-computed for each reference list RfListX (X=0, 1).

At the block 304 (macroblock or sub-macroblock) processing level, a chroma motion vector adjustment is calculated for the vertical motion vector component if necessary. Each of the blocks 304 comprises a field parity property that defines the current block 304 as a field block or a frame block. No chroma motion vector adjustment is performed if the current block 304 is a frame block. However, if the current block 304 is encoded as a field block, the chroma motion vector adjustment process described hereinbelow may be executed. Accordingly, for an MBAFF slice comprising a field encoded block, both pre-computed chroma adjustment arrays produced for each reference list RfListX (X=0, 1) are retrieved from storage or memory (e.g., memory 104, storage 108, storage/transmission medium 206, or memory 220). A top or bottom chroma adjustment array may selected based on whether the block 304 is a top or bottom block. A reference index (e.g., refIdx0 or refIdx1) for the luma motion vector may be used as the reference offset to retrieve the top or bottom chroma adjustment value. This value is added to the current vertical motion vector component to arrive at the final adjusted chroma motion vector vertical component. This is performed for both reference lists RfListX (X=0, 1) for the top and bottom blocks. These processes are described further below with reference to FIGS. 5-7.

According to the H.264 standard, for example, video compression may be accomplished in a video encoding, or coding, process in which the picture 300 is encoded as either a frame or as two fields. Each frame comprises a number of lines of spatial information. For example, a typical frame may contain 480 horizontal lines. Each field may contain half the number of lines in the frame. For example, if the frame comprises 480 horizontal lines, each field comprises 240 horizontal lines. In a typical configuration, one of the fields comprises the odd numbered lines in the frame and the other field comprises the even numbered lines in the frame. The field that comprises the odd numbered lines will be referred to as the "top" field hereafter and in the appended claims, unless otherwise specifically denoted. Likewise, the field that comprises the even numbered lines will be referred to as the "bottom" field hereafter and in the appended claims, unless otherwise specifically denoted. The two fields can be interlaced together to form an interlaced frame.

Figure 3B:
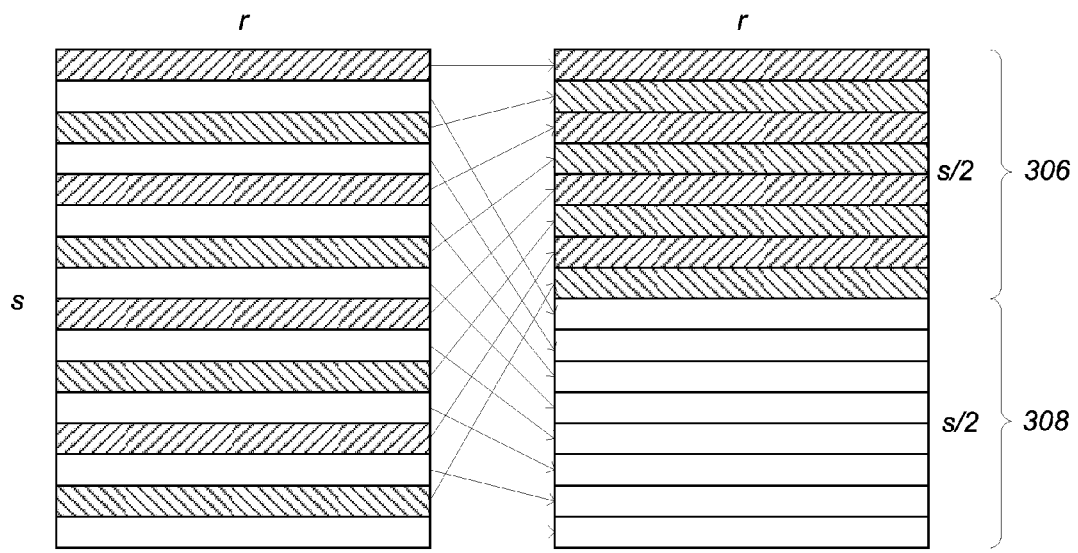
FIG. 3B illustrates one embodiment of the macroblock illustrated in FIG. 3A encoded in field mode.

FIG. 3B illustrates one embodiment of the macroblock 304 encoded in field mode. Accordingly, the macroblock is split into a "top" field 306 and a "bottom" field 308. The macroblock 304 comprises r rows of pixels and s columns of pixels. As previously discussed, in one embodiment, the value of r and s is 16, making the macroblock 304 a 16×16 pixel macroblock. As illustrated in FIG. 3B, every other row of pixels in the macroblock 304 is shaded. The shaded areas represent the rows of pixels in the top field of the macroblock 304 and the unshaded areas represent the rows of pixels in the bottom field of the macroblock 304.

Figure 4A:
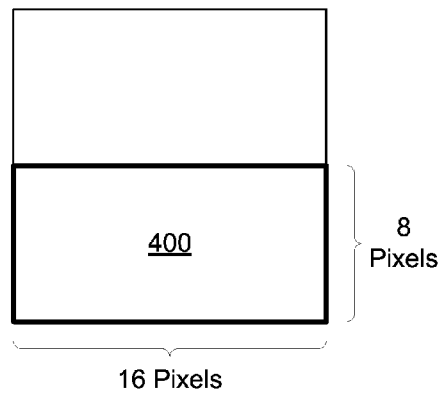
FIGS. 4A-F illustrate various embodiments of possible macroblock subdivisions into smaller sized blocks referred to as sub-macroblocks of various sizes.
Figure 4B:
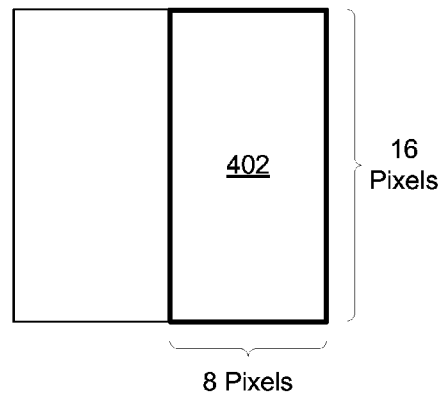
Figure 4C:
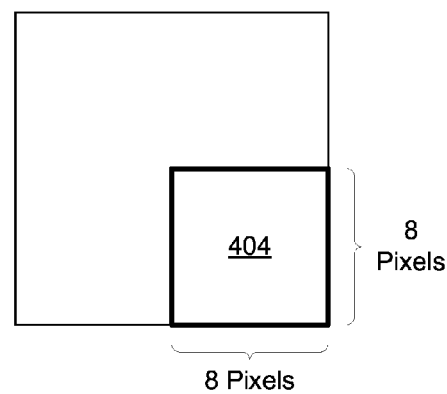
Figure 4D:
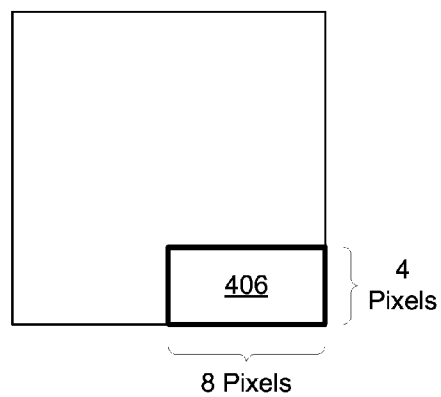
Figure 4E:
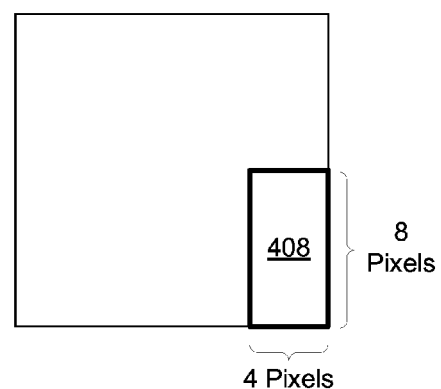
Figure 4F:
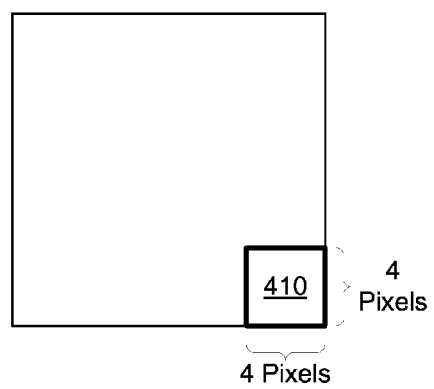

FIGS. 4A-F illustrate various embodiments of possible macroblock subdivisions into smaller sized blocks referred to as sub-macroblocks of various sizes. For example, as shown in FIGS. 4A-F, a macroblock can be further divided into block sizes of 16×8 pixels (FIG. 4A; 400), 8×16 pixels (FIG. 4B; 402), 8×8 pixels (FIG. 4C; 404), 8×4 pixels (FIG. 4D; 406), 4×8 pixels (FIG. 4E; 408), or 4×4 pixels (FIG. 4F; 410). The smaller block sizes may be preferable in some applications that use a temporal prediction with the motion compensation algorithm. In accordance with the H.264 standard, as previously discussed, a macroblock may comprise a block of 16×16 luma pixels. Each 8×8 pixel block (FIG. 4C) may be referred to as sub-macroblock and may be further divided into 8×4, 4×8, and 4×4 sub-macroblocks, for example. In accordance with the H.264 standard, the motion compensation prediction from the reference pictures may be used in the two reference lists. The minimum unit to apply motion compensation referred by different pictures is the sub-macroblock having an 8×8 pixel block size. The embodiments, however, are not limited to the elements or the arrangement shown or described in FIGS. 4A-F.

Figure 5:
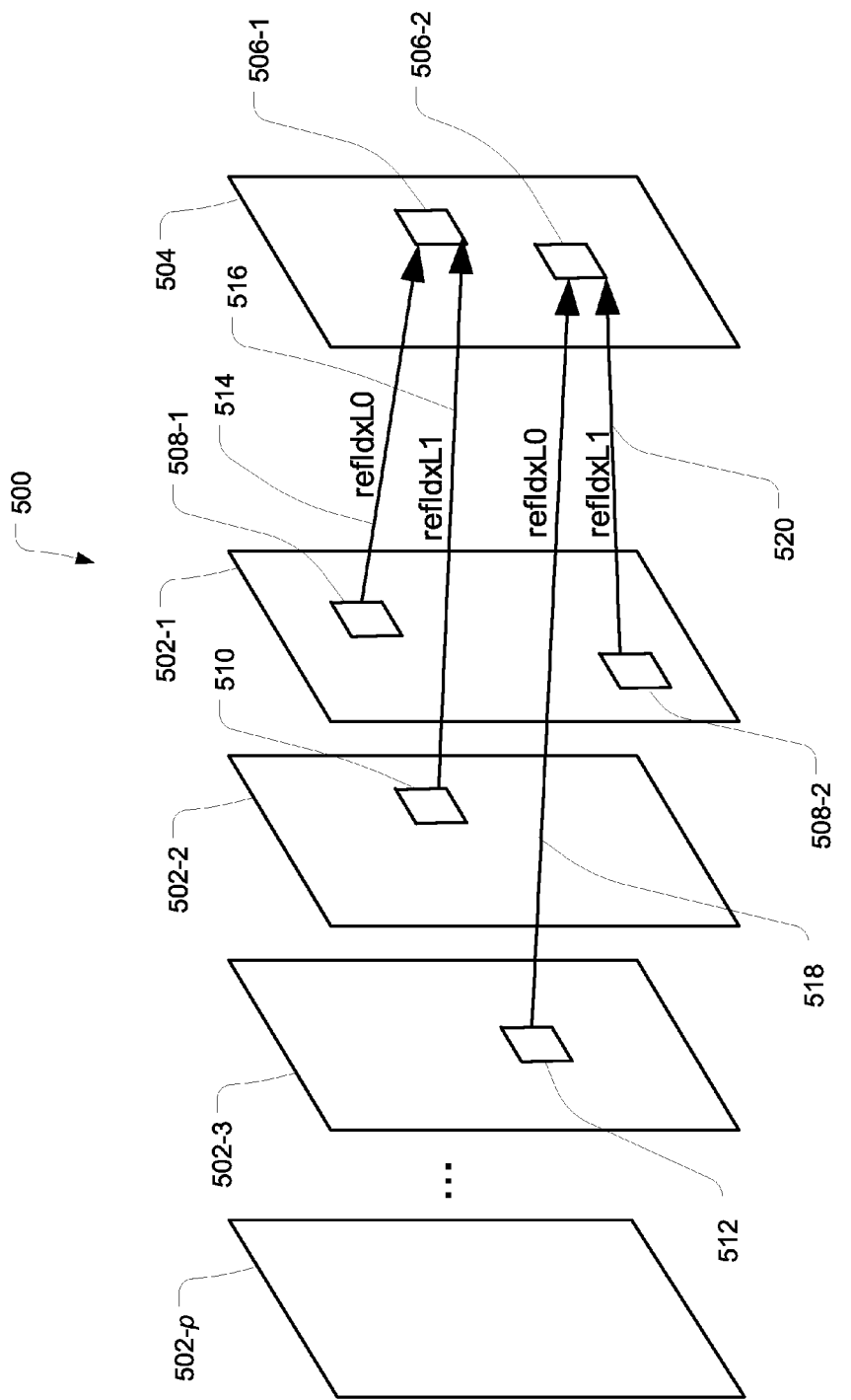
FIG. 5 illustrates one embodiment of a diagram of a motion vector compensation based on multiple reference pictures.

FIG. 5 illustrates one embodiment of a diagram 500 of a motion vector compensation based on multiple reference pictures. The diagram 500 shows a pictorial illustration of several decoded reference pictures 502 and a current picture 504 to be coded. The decoded reference pictures 502 may be available to predict further decoded pictures, for example. In one embodiment, the decoded reference pictures 502 may be organized or ordered into one or two reference lists Rflist0, Rflist1 (i.e., RListX, X=0, 1) in accordance with the H.264 standard, for example. The decoded reference pictures 502 may comprise multiple decoded reference picture 502-1-$p$. The motion vector compensation may utilize one or more of the multiple decoded reference pictures 502-1-$p$. In the embodiment illustrated in FIG. 5, the current picture 504 may be coded in accordance with the H.264 standard, and the motion vector compensation based on the H.264 standard may utilize p=16 decoded reference pictures, for example. Each of the decoded reference picture 502-1-$p$ or the current picture 504 may comprise slices (e.g., slice 302) and macroblocks (e.g., 304) of various sizes depending on the particular implementation similar to those previously discussed with reference to FIGS. 3 and 4A-F, for example. The embodiments, however, are not limited to the elements or the particular arrangement shown or described in FIG. 5.

As illustrated in FIG. 5, the current picture 504 to be coded comprises two blocks 506-1, 506-2 of pixels to be coded in the current picture 504. In one embodiment, the blocks 506-1, 506-2 may be an 8×8 rectangular group of pixels as previously discussed above. For example, each of the blocks 506-1, 506-2 may be comprised of 8×8 pixels (e.g., sub-macroblocks). From right-to-left, the first decoded reference picture 502-1 comprises two blocks 508-1, 508-2 each one comprised of 8×8 pixels. The second decoded reference picture 502-2 comprises one block 510 comprised of 8×8 pixels. And, the third decoded reference picture 502-3 comprises one block 512 comprised of 8×8 pixels. The decoded reference pictures 502-1-3 may be contained in two reference lists RfList0 and RfList1. The decoded reference pictures 502-1-3 may be used to reference all the sub-macroblocks (e.g., 508-1, 508-2, 510, 512) within a slice of the decoded reference pictures 502-1-3 and may be placed in the two reference picture lists RfList0 and RfList1. Each of the decoded reference pictures 502-1-3 may be accessed from the reference lists RfList0, RfList1 through an index, "refIdxLX" (X=0, 1), indicating the order of the decoded reference pictures 502-1-3. The video decoder (e.g., the decoder 208) decodes the reference index refIdxLX for every macroblock (or sub-macroblock) to access the associated decoded reference pictures 502-1-3 for reconstructing the pixels in the current picture 504 to be coded using motion compensation.

Each of the blocks 506-1, 506-2 comprises two reference indices refIdxL0 and refIdxL1 to point to any two reference pictures 502-1-3, for example, contained in the two reference lists RfList0, RfList1. For example, with respect to the first block 506-1 to be coded in the current picture 504, the decoder 208 decodes the first reference index refIdxL0 to access the first decoded reference picture 502-1 and decodes the second reference index refIdxL1 to access the second decoded reference picture 502-2. In the first block 506-1, the reference index refIdxL0 points to the block 508-1 in the reference picture 502-1 via motion vector 514 and the reference index refIdxL1 points to the block 510 in the reference picture 502-2 via motion vector 516. In the second block 506-2, the reference index refIdxL0 points to the block 512 in the reference picture 502-3 via motion vector 518 and the reference index refIdxL1 points to the block 508-2 in the reference picture 502-1 via motion vector 520. As previously discussed, the decoded reference pictures 502-1-3 are located in the two reference lists RfList0 and RfList1.

Operations for the above described embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Accordingly, the operations described in the following logic flows 600 and 700 provide an efficient task partition architecture. The partition architecture partitions the processing task among the slice and macroblock levels. For example, the chroma adjustment vectors are pre-computed at the slice layer and are then used at the macroblock level. In one embodiment, the partition architecture, minimizes the storage requirement and reduces the computational complexity of processing the chroma motion vector adjustment. In one implementation, the partition architecture may be applied to the field coding mode of the video decoder 208 implemented as an H.264 standard video decoder, for example. In the embodiments illustrated in FIGS. 6 and 7, the chroma motion vector adjustment parameters may be pre-computed at the slice layer and stored in memory and/or storage. The pre-computed chroma motion vector adjustment parameters may be used in processing at the macroblock (or sub-macroblock) level to reconstruct the vertical motion vector component of the chroma motion vector for the field coding mode of the H.264 standard video decoder 208.

One or more parameters associated with the following operations described with reference to FIGS. 6 and 7, may be stored in any suitable storage medium. For example, the parameters may be stored in the storage 108 of the general processing system 100 and may be temporarily stored in the memory 104 as well as the storage/transmission medium 206 or the memory 220 described with reference to the video encoding/decoding system 200 shown in FIG. 2.

Accordingly, the following parameter types may be produced and stored at the slice layer for MBAF and non-MBAFF cases:

When MBAFF=0 (i.e., non-MBAFF case), one parameter is pre-computed and stored for each reference list RfListX (X=0, 1). The pre-computed parameters at the slice layer for the non-MBAFF case are:
(1) chroma_adjustment_List0; and
(2) chroma_adjustment_List1.

When MBAFF=1 (i.e., MBAFF case), two parameters (top and bottom) are pre-computed and stored for each reference list RfListX (X=0, 1). The pre-computed parameters at the slice layer for the MBAFF case are:
(3) chroma_adjustment_mbaff_top_List0;
(4) chroma_adjustment_mbaff_bottom_List0;
(5) chroma_adjustment_mbaff_top_List1; and
(6) chroma_adjustment_mbaff_bottom_List1.

At the macroblock/sub-macroblock level, the reference index refIdx may be used to indicate the offset value of the pre-computed chroma motion vector arrays.

Figure 6:
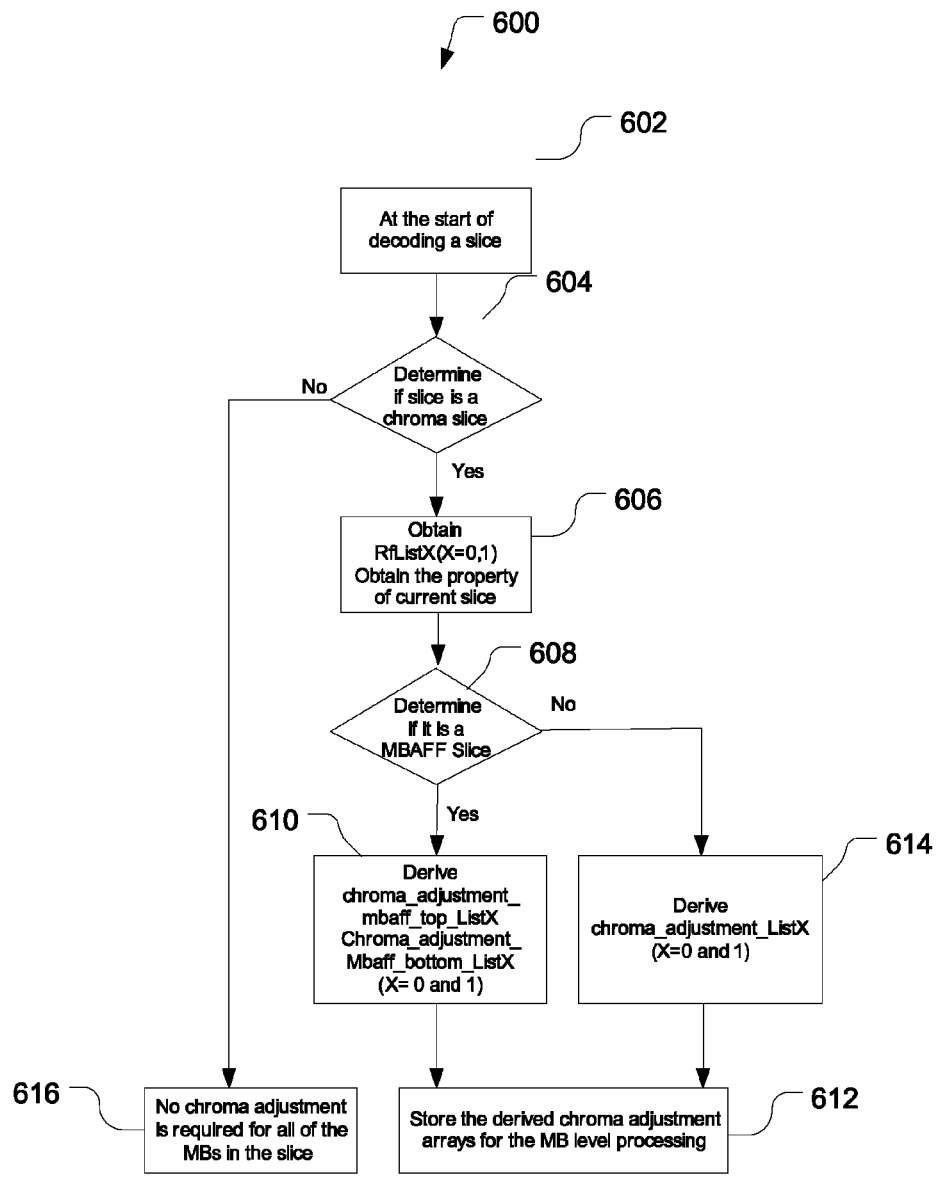
FIG. 6 illustrates one embodiment of a logic flow.

FIG. 6 illustrates one embodiment of a logic flow 600. The logic flow 600 may be representative of the operations executed by one or more embodiments described herein to pre-compute the chroma motion vector adjustment array at the slice layer. For example, the logic flow 600 will be described with reference to the operations of the system 200 to produce chroma motion vector adjustment arrays at the slice layer. It will be appreciated that the operations executed by the video decoder 208 may be implemented in software, hardware, or a combination thereof, an din in one embodiment, may be implemented utilizing the computing environment 100, for example. The embodiments, however, are not limited to the elements or the arrangement shown or described in FIG. 6.

Accordingly, an H.264 standard digital video signal sequence 212 comprising a bitstream may be conveyed from any one of the video source 202, the video encoder 204, and the storage/transmission medium 206 to the video decoder 208. The video decoder 208 receives the H.264 standard bitstream and processes a slice comprising multiple macroblocks. At the start (602) of decoding a current slice, the video decoder 208 determines (404) whether the received slice is a chroma slice. This determination may be done by decoding a first syntax element chroma_format_idc conveyed in the H.264 standard bitstream, for example. The slice is a chroma slice if chroma_format_idc>0 and it is a monochrome slice if chroma_format_idc=0. If the slice is a monochrome slice, the logic flow 600 continues along the "No" path and no chroma adjustment (616) is made to for the macroblocks within the slice being processed. If the slice is a chroma slice, the logic flow 600 continues along the "Yes" path and the video decoder 208 obtains (606) information associated with the reference lists for the current slice and the property of the current slice. For example, the video decoder 208 obtains the RfListX for X=0, 1. The video decoder 208 then determines (608) whether the slice is a MBAFF slice. In one embodiment, this may be done by examining second and third syntax elements mb_adaptive_frame_field_flag and field_pic_flag conveyed in the H.264 standard bitstream. For an MBAFF slice:

MBAFF_Flag=mb_adaptive_frame_field_flag&&!(field_pic_flag).

Accordingly, if the current slice is a MBAFF slice, the logic flow 600 continues along the "Yes" path and derives (610) or pre-computes chroma adjustment arrays based on the MBAFF property of the current slice for each reference list RfListX, X=0, 1, (e.g., RfList0, RfList1). A more comprehensive description of the operations to derive (610) or pre-compute the chroma adjustment arrays based on the MBAFF property of the current slice is provided below. When the current slice is a non-MBAFF slice, the logic flow 600 continues along the "No" path and derives (614) or pre-computes one chroma adjustment array for each reference list RfListX, X=0, 1. In either the MBAFF slice or non-MBAFF slice case, once the chroma adjustment arrays are derived, they are stored (612) in the storage/transmission medium 206 for processing at the macroblock level or any other suitable storage or memory.

In equations (1)-(6) described below, the variable current_picture refers to the current picture 502 and the variables RfList0[i] and RfList1[i] refer to the i-th reference picture 502 in the respective reference lists RfList0 and RfList1. The top_field and bottom_field refer to the field parity property of the current picture 504 and the reference pictures 502 in the reference lists RfList0 and RfList1, e.g., whether the current picture 504 and/or the i-th reference picture 502 is a top field or a bottom field picture.

When the current slice is a non-MBAFF slice, the logic flow 600 continues along the "No" path and derives (614) one chroma adjustment array for each reference list RfListX, X=0, 1. Equation (1) below may be implemented by the processor 209 in the video decoder 208 or the computing system 100 to produce an i-th component of a first chroma adjustment array using the first reference list RfList0. The first chroma adjustment array may be referred to throughout this description as the chroma_adjustment_List0 array, for example:

$$\text{chroma\_adjustment\_List0}[i] = \begin{cases} -2, & \text{if}((\text{current\_picture} == \text{top\_field}) \text{ AND } (\mathit{RfList}0[i] == \text{bottom\_field})) \\ 2, & \text{if}((\text{current\_picture} == \text{bottom\_field}) \text{ AND } (\mathit{RfList}0[i] == \text{top\_field})) \\ 0, & \text{otherwise} \end{cases} \quad (1)$$

The following pseudo code may serve to describe equation (1) to pre-compute the chroma_adjustment_List0 array. In the pseudo code the reference list size of the reference list RfList0 is given as ListSize. In one embodiment, the maximum allowable value for ListSize may be 32, for example. The pseudo code may be:

```
for (i=0; i < ListSize; i++)
    {
    chroma_adjustment_List0[i]=0 // initialize
    If ((current_picture_parity == top_field) && (the picture of
RfList0[i] == bottom_field))
        chroma_adjustment_List0[i] = -2
    Else if ((current_picture_parity == bottom_field) && (the picture of
RfList0[i] == top_field))
        chroma_adjustment_List0[i] = 2
    }
```

Accordingly, the i-th component of the chroma_adjustment_List0 may be generated based on the field parity property of the i-th reference picture (e.g., decoded reference pictures 502) in the RfList0 of the current slice. It may be assigned the value "2" if the current picture (e.g., current picture 504) is a bottom field and the i-th reference picture in the RfList0 is a top field picture, and it may be assigned the value "−2" if the current picture is a top field and the i-th picture in the RfList0 is a bottom field picture, and be assigned the value "0" if either one of the two above-described conditions is not met. Similarly, an i-th component of a second chroma adjustment array chroma_adjustment_List1 may be generated based on the field parity property of the current picture and of the i-th picture in the RfList1 reference list of the current slice in accordance with equation (2) below:

$$\text{chroma\_adjustment\_List1}[i] = \begin{cases} -2, & \text{if}((\text{current\_picture} == \text{top\_field}) \text{ AND } (\mathit{RfList}1[i] == \text{bottom\_field})) \\ 2, & \text{if}((\text{current\_picture} == \text{bottom\_field}) \text{ AND } (\mathit{RfList}1[i] == \text{top\_field})) \\ 0, & \text{otherwise} \end{cases} \quad (2)$$

When the current slice is a MBAFF slice, the logic flow 600 continues along the "Yes" path and derives (610) the chroma adjustment arrays based on the MBAFF property of the current slice. Accordingly, when the current slice is a MBAFF, two chroma adjustment arrays are produced for each of the reference lists RfList0 and RfList1. Third and fourth chroma adjustment arrays chroma_adjustment_mbaff_top_List0 array and the chroma_adjustment_mbaff_bottom_List0, respectively, are produced for the first reference list RfList0 in accordance with equations (3) and (4) below to produce an i-th component of the chroma_adjustment_mbaff_top_List0 and chroma_adjustment_mbaff_bottom_List0 arrays. The third and fourth chroma adjustment arrays may be referred to as the chroma_adjustment_mbaff_top_List0 array and the chroma_adjustment_mbaff_bottom_List0, respectively, throughout this description. Equations (3) and (4) below may be implemented by the processor 209 in the video decoder 208 or the computing system 100 to produce the i-th component of the third and fourth chroma adjustment arrays using the first reference list RfList0. Equations (3) and (4) may be generated based on the field parity property of the i-th picture in the first reference list RfList0 of the current slice in accordance with equations (3) and (4) below:

$$\text{chroma\_adjustment\_mbaff\_top\_List0}[i] = \quad (3)$$
$$\begin{cases} -2, & \text{if } (\mathit{RfList}0[i] == \text{bottom\_field}) \\ 0, & \text{otherwise} \end{cases}$$

$$\text{chroma\_adjustment\_mbaff\_bottom\_List0}[i] = \quad (4)$$
$$\begin{cases} 2, & \text{if } (\mathit{RfList}0[i] == \text{top\_field}) \\ 0, & \text{otherwise} \end{cases}$$

In accordance with equation (3), the i-th component of the chroma_adjustment_mbaff_top_List0 array may be generated based on the field parity property of the i-th picture in the RfList0 of the current slice. It may be assigned the value "−2" if the i-th picture in the RfList0 is a bottom field picture, and may be assigned the value "0" if the above-described condition is not met. In accordance with equation (4), the i-th component of the chroma_adjustment_mbaff_bottom_List0 array may be assigned the value "2" if the i-th picture in the RfList0 is a top field picture, and it may be assigned the value "0" if the above-described condition is not met.

Similarly, fifth and sixth chroma adjustment arrays chroma_adjustment_mbaff_top_List1 and chroma_adjustment_mbaff_bottom_List1, respectively, are produced for the second reference list RfList1 in accordance with equations (5) and (6) below to produce an i-th component of the chroma_adjustment_mbaff_top_List1 and the chroma_adjustment_mbaff_bottom_List1 arrays. The fifth and sixth chroma adjustment arrays may be referred to as chroma_adjustment_mbaff_top_List1 and the chroma_adjustment_mbaff_bottom_List1, respectively, throughout this description. Equations (4) and (5) below may be implemented by the processor 209 in the video decoder 208 or the computing system 100 to produce the i-th component of the fifth and sixth chroma adjustment arrays using the second reference list RfList1. Equations (5) and (6) may be generated based on the field parity property of the i-th picture in the second reference list RfList1 of the current slice in accordance with equations (5) and (6) below:

$$\text{chroma\_adjustment\_mbaff\_top\_List1}[i] = \quad (5)$$
$$\begin{cases} -2, & \text{if } (\mathit{RfList}1[i] == \text{bottom\_field}) \\ 0, & \text{otherwise} \end{cases}$$

$$\text{chroma\_adjustment\_mbaff\_bottom\_List1}[i] = \quad (6)$$
$$\begin{cases} 2, & \text{if } (\mathit{RfList}1[i] == \text{top\_field}) \\ 0, & \text{otherwise} \end{cases}$$

Figure 7:
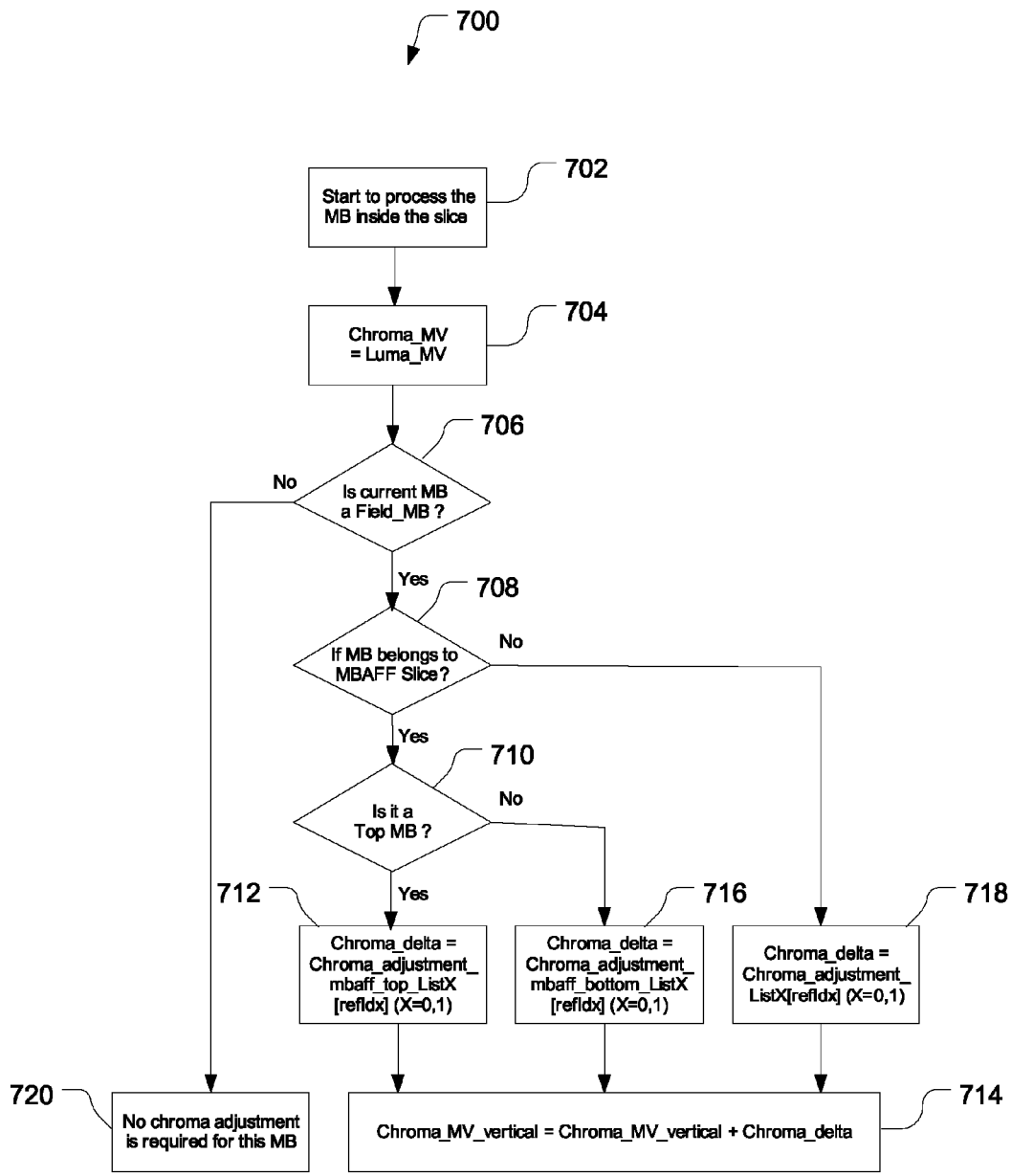
FIG. 7 illustrates one embodiment of a logic flow.

FIG. 7 illustrates one embodiment of a logic flow 700. The logic flow 700 may be representative of the operations executed by one or more embodiments described herein. The logic flow 700 illustrates one embodiment of the macroblock (or sub-macroblock) level process to reconstruct the chroma motion vector utilizing the pre-computed chroma motion vector adjustment arrays chroma_adjustment_List0, chroma_adjustment_List1, chroma_adjustment_mbaff_top_List0, chroma_adjustment_mbaff_bottom_List0, chroma_adjustment_mbaff_top_List1, and chroma_adjustment_mbaff_bottom_List1 as illustrated in FIG. 6, for example. The logic flow 700 will be described with reference to the operations of the system 200 to produce chroma motion vector adjustment arrays at the slice layer, for example. It will be appreciated that the operations executed by the video decoder 208 may be implemented in software, hardware, or a combination thereof. In one embodiment, the operations may be executed by the processor 209 in the video decoder 208 or the computing system 100, for example. The embodiments, however, are not limited to the elements or the arrangement shown or described in FIG. 7.

Accordingly, at the start (702) of the macroblock (or sub-macroblock) processing level, the luma motion vector is copied (704) onto the chroma motion vector. It is noted that both the horizontal and the vertical motion vector components of the luma motion vector are copied and the adjustments may be performed only on the vertical component, for example. The video decoder 208 then determines (706) whether the current macroblock is a field macroblock. In one embodiment, this may be done by examining the field parity property of the current macroblock by checking the derived mb_field_decoding_flag for the MBAFF case, or the field_pic_flag for the non-MBAFF case. For the MBAFF case, if the derived mb_field_decoding_flag=1, then the current macroblock is a field macroblock, otherwise, it is a frame macroblock. For the non-MBAFF case, if the field_pic_flag=1, then the current is a field macroblock (e.g., the macroblock 304 as shown in FIG. 3B), otherwise it is a frame macroblock. If the current macroblock is a frame macroblock, the logic flow 700 continues along the "No" path and chroma motion vector adjustment is performed (720).

If, however, the current macroblock is encoded as field macroblock, the logic flow 700 continues along the "Yes" path to execute the adjustment process. Accordingly, the video decoder 208 now determines (708) whether the macroblock belongs to the MBAFF slice. If it does, the logic flow 700 continues along the "Yes" path and the process continues by retrieving the chroma adjustment value through one of the stored pre-computed chroma adjustment arrays: the chroma_adjustment_mbaff_top_List0 or the chroma_adjustment_mbaff_bottom_List0. The video decoder 208 now determines (710) whether the current macroblock is a top macroblock in a macroblock pair, i.e., (mb_number % 2)=0. If the macroblock is a top macroblock (e.g., top field 306 shown in FIG. 3B), the video decoder 208 selects (712) the chroma_adjustment_mbaff_top_List0. Otherwise, the current macroblock is a bottom macroblock (e.g., bottom field as shown in FIG. 3B) and the video decoder 208 selects (716) the chroma_adjustment_mbaff_bottom_List0. As an example, the retrieved or selected chroma adjustment value may be denoted as the chroma_delta as shown in logic blocks 712 and 716. The associated refIdx of the luma motion vector may be used as the reference offset to retrieve the chroma adjustment value from the chroma_adjustment_mbaff_top_List0 or from the chroma_adjustment_mbaff_bottom_List0. As previously discussed, the retrieved or selected value is denoted as the chroma_delta. Accordingly, in either case, whether the current macroblock is a top or bottom macroblock, after the appropriate chroma_delta (e.g., chroma adjustment array) is selected in blocks 712 or 716 the logic flow 700 continues to add (714) the retrieved chroma_delta to the vertical motion vector component chroma_mv_vertical to determine the final chroma motion vector vertical component.

In a similar manner to that discussed above, the adjusted chroma motion vector vertical component may be determined by using the chroma_adjustment_mbaff_top_List1 or the chroma_adjustment_mbaff_bottom_List1 for the luma motion vector referred to by RfList1.

Because the MBAFF property is decoded at the slice layer and the MBAFF/non-MBAFF property will be the same for all the macroblocks within the slice, the process at the macroblock level may be simplified by dividing the implementation for both MBAFF and the non-MBAFF. Accordingly, if it is determined at decision block 708 that the macroblock does not belong to the MBAFF slice, the logic flow 700 continues along the "No" path for the case of a non-MBAFF macroblock. This division may provide an optimal execution at the macroblock/sub-macroblock level, for example. In the MBAFF case, the examination of a current macroblock to be the MBAFF macroblock may not be required because it may be known at the slice layer. In the non-MBAFF case, however, the examination of the current macroblock to be both a field macroblock and a non-MBAFF macroblock both may be removed because both properties are known at the slice layer. Accordingly, the chroma_delta is selected (718) as the chroma_adjustment_ListX[refIdx] where X=0, 1. The logic flow 700 continues to the next logic block, where the current chroma_delta is used to determine (714) the adjusted chroma motion vector vertical component using the chroma_adjustment_List0 for the luma motion vector referred to by RfList0 or the chroma_adjustment_ List1 for the luma motion vector referred to by RfList1.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

The functions of the various described embodiments shown in the figures including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), programmable logic devices (PLD), field programmable gate array (FPGA), read-only memory (ROM) for storing software, random access memory (RAM), and non-volatile storage. Other hardware, conventional and/or custom, may also be included. Similarly, any functional blocks shown in the figures are conceptual only. Their function may be carried out through the operation of program logic, through dedicated logic, through the interaction of program control and dedicated logic, or even manually, the particular technique being selectable by the implementer as more specifically understood from the context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, ASIC, PLD, DSP, FPGA, logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

For the sake of presentation, the description may use terms like "obtain," "determine," "derive," "store," "adjust," and the like to describe computer operations in a computing environment. These terms are high-level abstractions for operations performed by a computer and/or processor and should not be confused with acts performed by a human being. The actual computer and/r processor operations corresponding to these terms may vary depending on implementation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A video decoder, comprising:
circuitry to retrieve from a compressed video stream a current slice of a picture encoded in the compressed video stream, set a chroma motion vector for a current block of the current slice equal to a luma motion vector for the current block, determine whether the current block is a field block, and when the current block is a field block, adjust the chroma motion vector based on one or more pre-computed chroma motion vector adjustment arrays for the current slice, the current slice comprising multiple macroblocks and one of the multiple macroblocks comprising the current block, the circuitry to determine whether the current slice is a macroblock adaptive frame field (MBAFF) slice when the current block is a field block, the circuitry to determine whether the current block is a top block or a bottom block when the current slice is an MBAFF slice and the current block is a field block, and the circuitry to adjust the chroma motion vector based on top parameters comprised in a first pre-computed chroma adjustment array for a first reference list for the current slice and on top parameters comprised in a first pre-computed chroma adjustment array for a second reference list for the current slice when the current slice is an MBAFF slice and the current block is a top block.

2. The video decoder of claim 1, the circuitry to retrieve first and second reference lists for the current slice from the compressed video stream, and to adjust the chroma motion vector based on a pre-computed chroma adjustment array for the first reference list and on a pre-computed chroma adjustment array for the second reference list when the current slice is a non-MBAFF slice and the current block is a field block.

3. The video decoder of claim 1, the circuitry to adjust the chroma motion vector based on bottom parameters comprised in a second pre-computed chroma adjustment array for a first reference list for the current slice and on bottom parameters comprised in a second pre-computed chroma adjustment array for a second reference list for the current slice when the current slice is an MBAFF slice and the current block is a bottom block.

4. The video decoder of claim 1, the circuitry to set a horizontal component of the chroma motion vector equal to a horizontal component of the luma motion vector and set a vertical component of the chroma motion vector equal to a vertical component of the luma motion vector, but to adjust only the vertical component of the chroma motion vector.

5. The video decoder of claim 1, the circuitry not to adjust the chroma motion vector when the current block is a frame block.

6. The video decoder of claim 1, comprising a memory coupled to the circuitry, the memory to store the one or more pre-computed chroma motion vector adjustment arrays.

7. A computer-implemented method, comprising:
retrieving from a compressed video stream a current slice of a picture encoded in the compressed video stream;
retrieving from the compressed video stream first and second reference lists for the current slice;
setting, by a processor circuit, a chroma motion vector for a current block of the current slice equal to a luma motion vector for the current block;
determining whether the current block is a field block;
when the current block is a field block, adjusting the chroma motion vector based on one or more pre-computed chroma motion vector adjustment arrays for the current slice, the pre-computed chroma motion vector adjustment arrays pre-computed based on the first reference list and the second reference list, the current slice comprising multiple macroblocks and one of the multiple macroblocks comprising the current block;

determining whether the current slice is a macroblock adaptive frame field (MBAFF) slice when the current block is a field block;

determining whether the current block is a top block or a bottom block when the current slice is an MBAFF slice and the current block is a field block; and adjusting the chroma motion vector based on top parameters comprised in a first pre-computed chroma adjustment array for the first reference list for the current slice and on top parameters comprised in a first pre-computed chroma adjustment array for the second reference list for the current slice when the current slice is an MBAFF slice and the current block is a top block.

8. The method of claim 7, comprising adjusting the chroma motion vector based on a pre-computed chroma adjustment array for the first reference list for the current slice and on a pre-computed chroma adjustment array for the second reference list for the current slice when the current slice is a non-MBAFF slice and the current block is a field block.

9. The method of claim 7, comprising adjusting the chroma motion vector based on bottom parameters comprised in a second pre-computed chroma adjustment array for the first reference list for the current slice and on bottom parameters comprised in a second pre-computed chroma adjustment array for the second reference list for the current slice when the current slice is an MBAFF slice and the current block is a bottom block.

10. The method of claim 7, comprising setting a horizontal component of the chroma motion vector equal to a horizontal component of the luma motion vector and setting a vertical component of the chroma motion vector equal to a vertical component of the luma motion vector, and adjusting only the vertical component of the chroma motion vector.

11. The method of claim 7, comprising not adjusting the chroma motion vector when the current block is a frame block.

12. At least one non-transitory machine-readable medium comprising a set of instructions that, in response to being executed on a computing device, cause the computing device to:

retrieve from a compressed video stream a current slice of a picture encoded in the compressed video stream;

copy a luma motion vector for a current block of the current slice to a chroma motion vector for the current block;

determine whether the current block is a field block;

when the current block is a field block, adjust the chroma motion vector based on multiple pre-computed chroma motion vector adjustment arrays for the current slice, the current slice comprising multiple macroblocks and one of the multiple macroblocks comprising the current block determine whether the current slice is a macroblock adaptive frame field (MBAFF) slice when the current block is a field block;

determine whether the current block is a top block or a bottom block when the current slice is an MBAFF slice and the current block is a field block; and adjust the chroma motion vector based on top parameters comprised in a first pre-computed chroma adjustment array for a first reference list for the current slice and on top parameters comprised in a first pre-computed chroma adjustment array for a second reference list for the current slice when the current slice is an MBAFF slice and the current block is a top block.

13. The at least one non-transitory machine-readable medium of claim 12, comprising instructions that, in response to being executed on the computing device, cause the computing device to:

retrieve first and second reference lists for the current slice from the compressed video stream; and adjust the chroma motion vector based on a pre-computed chroma adjustment array for a first reference list and on a pre-computed chroma adjustment array for a second reference list when the current slice is a non-MBAFF slice and the current block is a field block.

14. The at least one non-transitory machine-readable medium of claim 12, comprising instructions that, in response to being executed on the computing device, cause the computing device to adjust the chroma motion vector based on bottom parameters comprised in a second pre-computed chroma adjustment array for a first reference list for the current slice and on bottom parameters comprised in a second pre-computed chroma adjustment array for a second reference list for the current slice when the current slice is an MBAFF slice and the current block is a bottom block.

15. The at least one non-transitory machine-readable medium of claim 12, comprising instructions that, in response to being executed on the computing device, cause the computing device to set a horizontal component of the chroma motion vector equal to a horizontal component of the luma motion vector and set a vertical component of the chroma motion vector equal to a vertical component of the luma motion vector, but to adjust only the vertical component of the chroma motion vector.

16. The at least one non-transitory machine-readable medium of claim 12, comprising instructions that, in response to being executed on the computing device, cause the computing device not to adjust the chroma motion vector when the current block is a frame block.

* * * * *